United States Patent
Noritake et al.

(10) Patent No.: US 6,935,611 B2
(45) Date of Patent: Aug. 30, 2005

(54) MOTOR CONTROL DEVICE FOR FLOW CONTROL DEVICE

(75) Inventors: Seiichiro Noritake, Nagano (JP); Ryuhei Wada, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 29 days.

(21) Appl. No.: 10/738,649

(22) Filed: Dec. 17, 2003

(65) Prior Publication Data
US 2004/0159809 A1 Aug. 19, 2004

(30) Foreign Application Priority Data
Dec. 24, 2002 (JP) ........................................ 2002-371777

(51) Int. Cl.⁷ .............................................. F16K 31/02
(52) U.S. Cl. .............................. 251/129.04; 251/129.11; 318/128; 318/129
(58) Field of Search ................... 251/129.04, 129.11, 251/129.12, 129.13; 318/127, 128, 129, 362

(56) References Cited

U.S. PATENT DOCUMENTS

| | | | | |
|---|---|---|---|---|
| 4,318,018 A | * | 3/1982 | Kennedy | 310/164 |
| 4,486,697 A | * | 12/1984 | Diefenbach et al. | 318/703 |
| 4,812,691 A | * | 3/1989 | Bertram et al. | 318/136 |
| 5,036,886 A | * | 8/1991 | Olsen et al. | 251/129.11 |
| 5,337,030 A | * | 8/1994 | Mohler | 310/156.37 |
| 6,069,466 A | * | 5/2000 | Noritake et al. | 318/282 |
| 6,756,871 B1 | * | 6/2004 | Suzuki et al. | 335/229 |

FOREIGN PATENT DOCUMENTS

JP 2001-346399 12/2001

* cited by examiner

*Primary Examiner*—John Bastianelli
(74) *Attorney, Agent, or Firm*—Hogan & Hartson, LLP

(57) ABSTRACT

A motor control device for a flow control device includes an opening part through which an upstream side of a fluid flow passage is in communication with a downstream side of the fluid flow passage, a valve element that controls a flow of a fluid which passes through the opening part, a motor which includes a rotor and a stator that relatively moves the valve element with respect to the opening part and a drive control section by which the motor is rotationally driven and controlled. Drive pulses are outputted from the drive control section for rotationally driving the rotor of the motor and a stop pulse is outputted from the drive control section and set to be a period width longer than that of the drive pulse for stopping the rotor of the motor at a prescribed position. The stop pulse is applied to the motor and the rotor stops at the prescribed position by a magnetic detent torque between the rotor and the stator.

18 Claims, 5 Drawing Sheets

[Fig. 1]
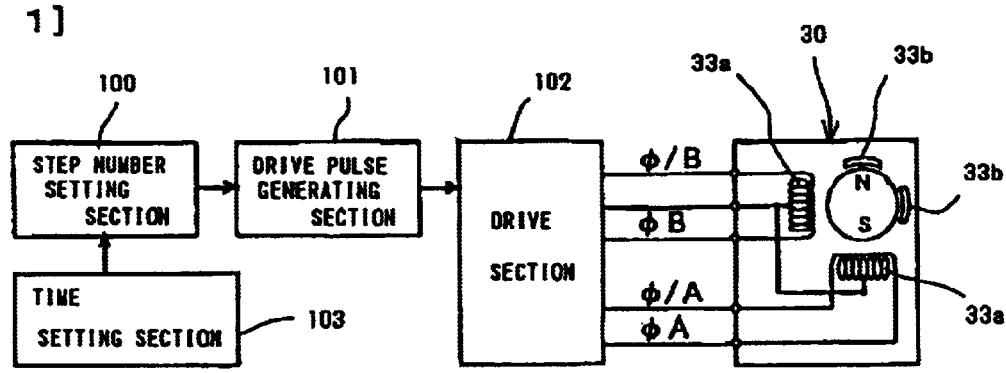
[Fig. 2]
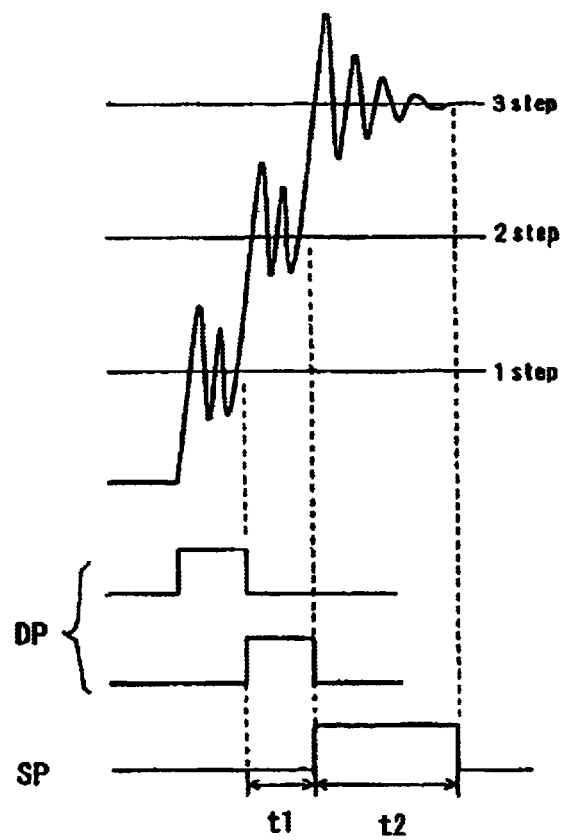

[FIG. 3]
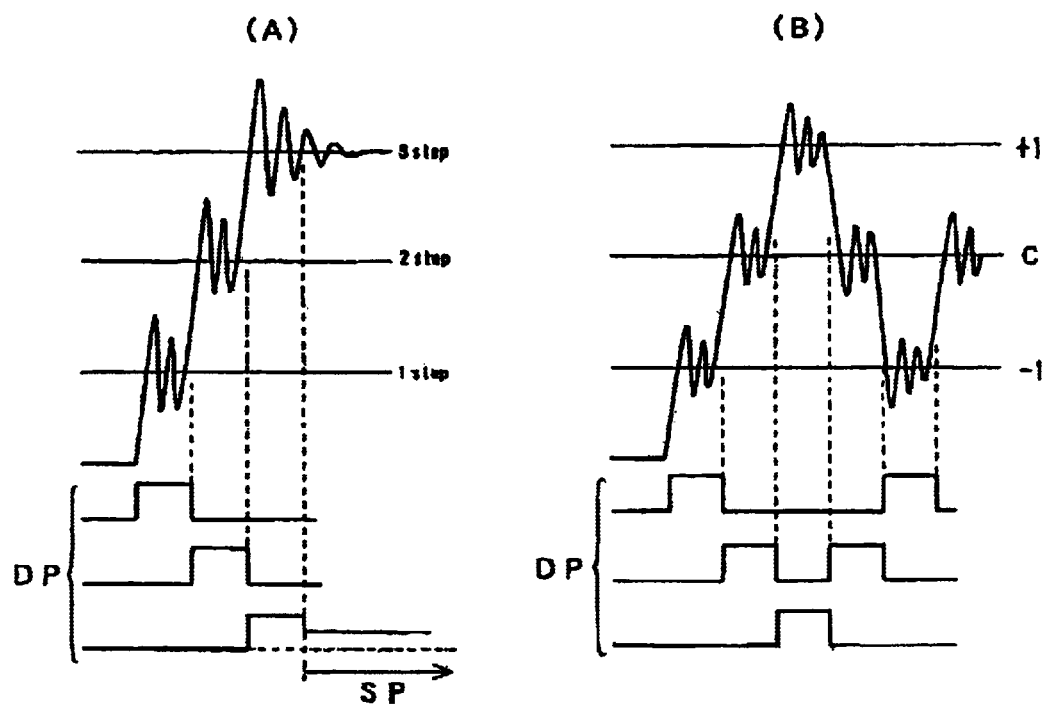
[FIG. 6]
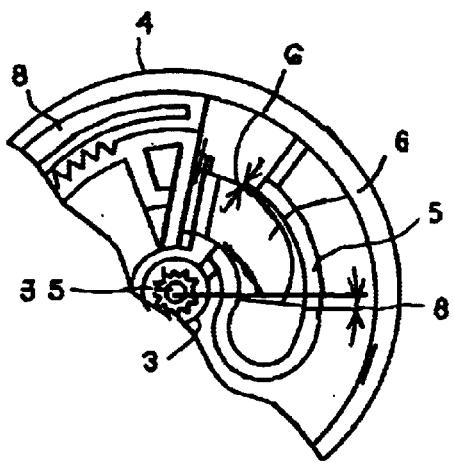

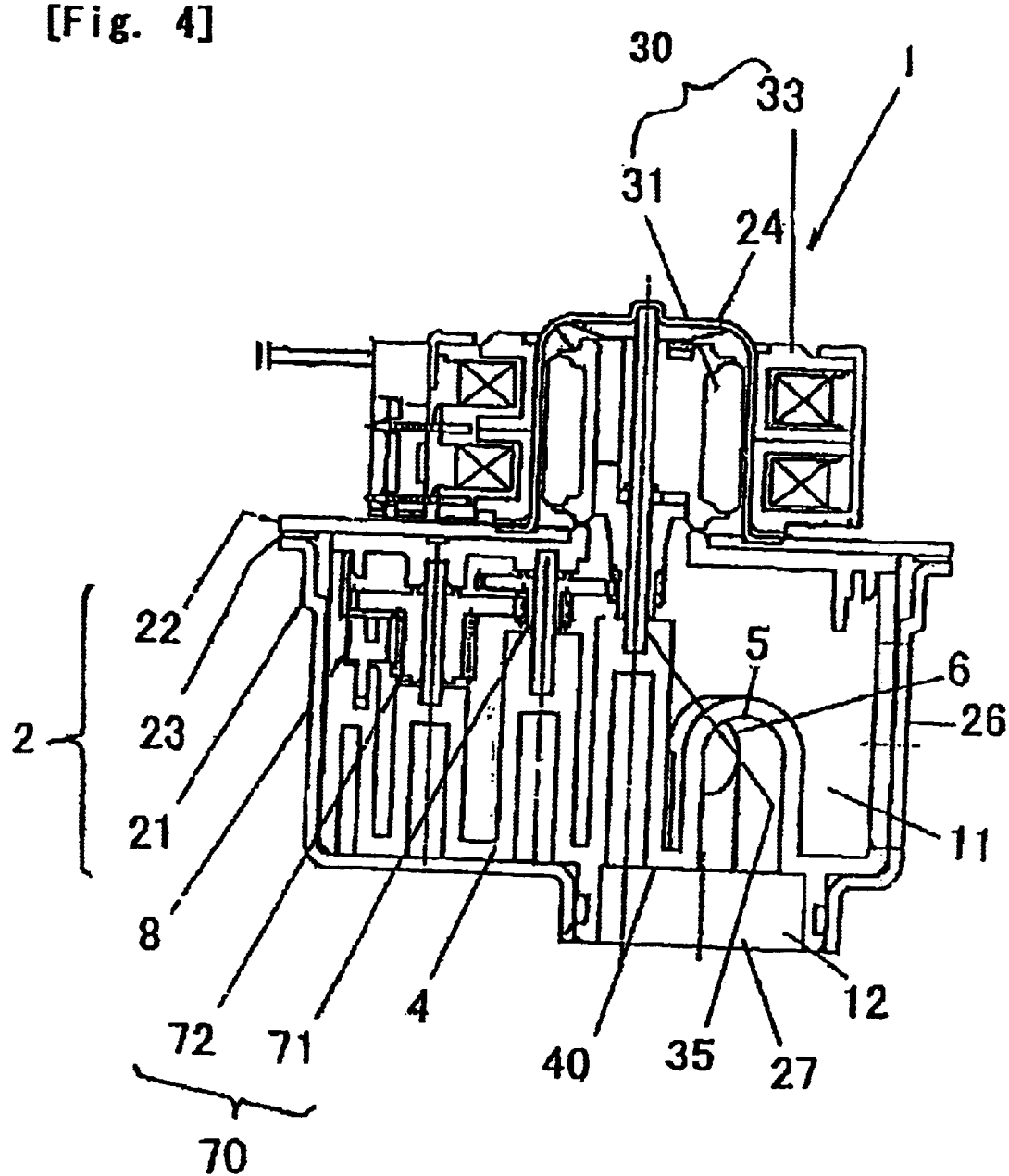
[Fig. 4]

[Fig. 5]
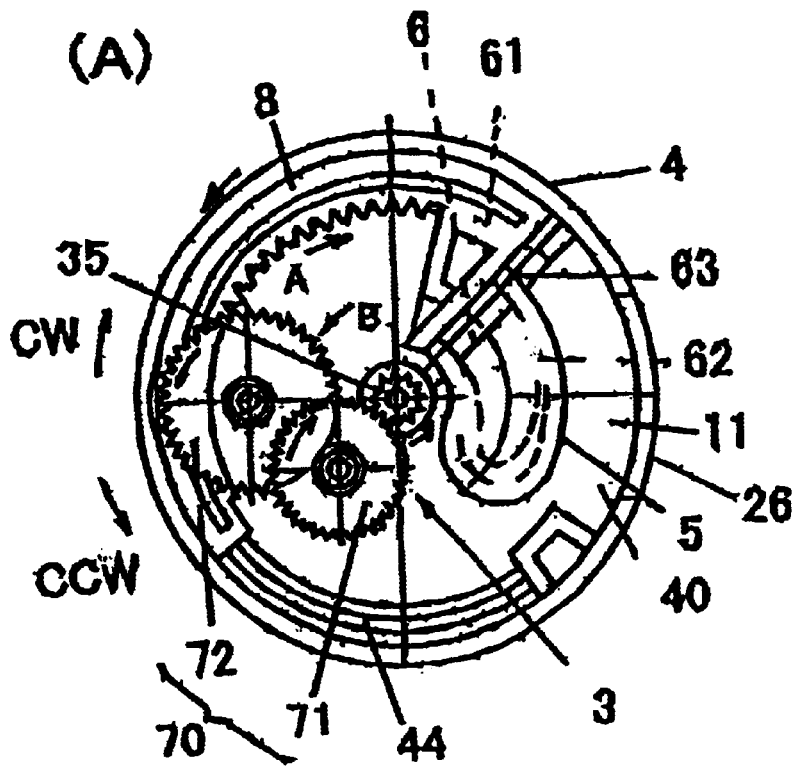
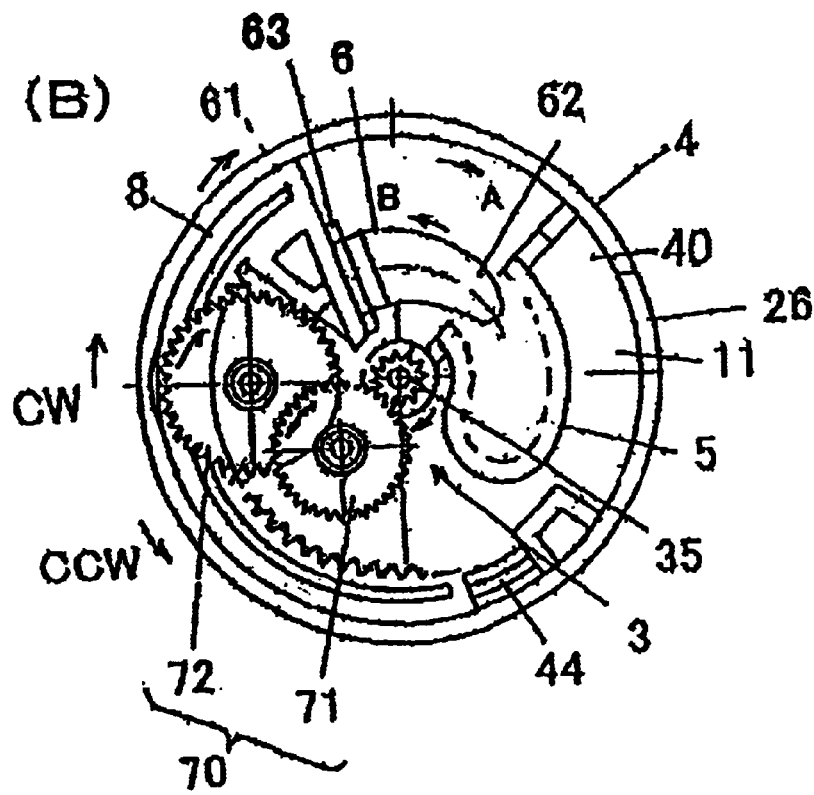

[Fig. 7]
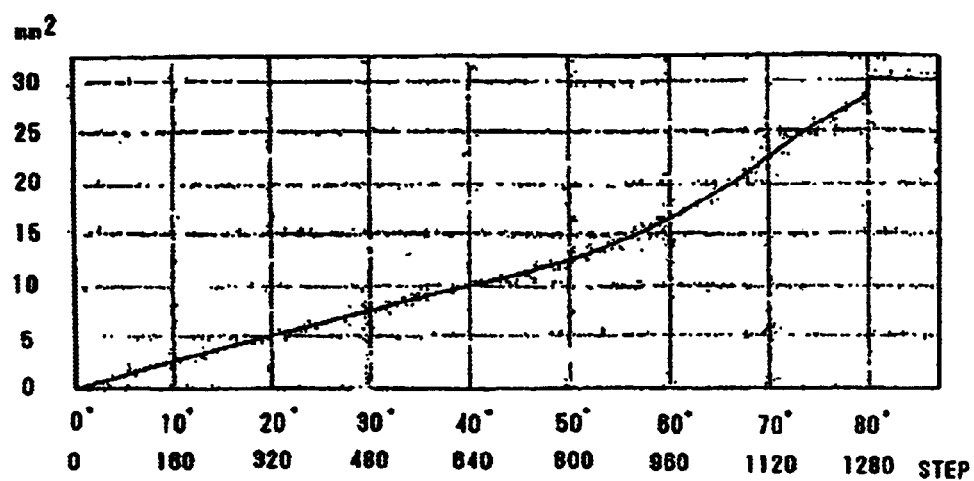
[Fig. 8]
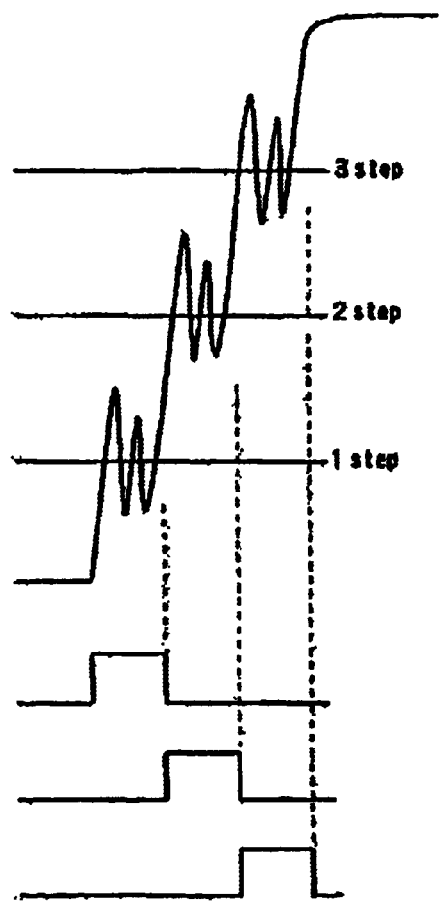

MOTOR CONTROL DEVICE FOR FLOW CONTROL DEVICE

BACKGROUND OF THE INVENTION

1. Field of the Invention

The present invention relates to a flow control device for controlling the flow rate of various kinds of fluids. Specifically, the present invention relates to a control device for a motor which drives a valve mechanism of the flow control device.

2. Description of Related Art

A flow control device is used to control the flow rate of gas or a liquid, for example, an energy medium such as liquefied petroleum (LP) gas, town gas or oil, or a coolant or warm water, which are used in equipment such as a water heater, a refrigerator or an air-conditioner. Regarding the mechanism for controlling the flow rate of gas or a liquid in the flow control device, a valve mechanism is used in which a valve element is driven by a solenoid or a motor. However, the solenoid driven system controls the valve element only to be opened or closed, and thus the flow rate cannot be controlled with a fine adjustment and a high degree of accuracy. Also, when the valve element is closed, an impact sound generates. On the other hand, a new system is proposed wherein a valve driving device with a motor as a driving source relatively moves a valve element with respect to an opening part. Thereby, the flow rate can be controlled with a high degree of accuracy in comparison with the solenoid driven system.

A stepping motor is used as the motor which is capable of controlling the rotational angle by applying a specified number of driving pulses. The stepping motor is provided with a detent torque which makes a rotor stop by using a magnetic attraction force with a stator. Therefore, after the specified number of driving pulses are applied to the motor in order to rotate and drive the rotor, the energization to the stepping motor stops and a stopped position is maintained by the detent torque. However, the stepping motor used in the valve driving device is designed so as to shut tightly between the rotor and the stator with a shielding member in order to prevent the leakage of a fluid such as gas, and thus the clearance between the rotor and the stator becomes large, which causes the detent torque to decrease. In this case, when the energization of the stepping motor stops, the damping time becomes longer and it takes a longer time to stop the rotor and further its stop position becomes unstable.

In other words, assume that, for example, after the specified number of driving pulses has been applied to the motor in order to obtain a prescribed flow rate, and then the driving pulse stops. When the drive pulse stops at the time when the magnitude of the damping of the rotor does not become smaller than that of the force of the detent torque, below which the position between the rotor and the stator can be maintained, the rotor may rotate due to the damping of the rotor to a different position without stopping at the specified position and the stop position may shift as shown in FIG. 8. In this case, the position of the valve element shifts according to the deviation of the stop position of the rotor, and thus the flow rate becomes different from the prescribed value. Also, the control, for example, temperature control, cannot be attained with a high degree of accuracy. Moreover, due to the deviation of the stop position of the rotor, the stepping motor may not start due to stepping-out even when driving pulses are applied to the motor.

A stepping motor driving device is proposed as a device for preventing stepping-out and for starting surely. This stepping motor driving device provides main pulses for driving the stepping motor and a stop position reset pulse, which are applied as driving pulses, and the frequency of the stop position reset pulse is set to be different from that of the main pulse. At the initial stage of a start operation from a stop state, by energization to the motor, one pulse of the stop position reset pulse is applied for making the motor return to the prescribed stop position. Thereby, stepping-out is prevented when the stepping motor starts.

As described above, when the stepping motor is used in the valve driving device, the stop position of the rotor may be unstable when the energization stops. Therefore, stepping-out may easily occur when the motor starts from the stop state with no energization and the flow rate may become different from a prescribed value due to the positional displacement of the valve element. The stepping motor drive device described above prevents the problem of stepping-out as described above. However, the above-mentioned drive device fails to control the rotor to stop at the specified position. Accordingly, the position of the valve element of the valve drive device may shift due to the displacement of the stop position of the rotor, and thus the flow rate may become different from the prescribed value.

SUMMARY OF THE INVENTION

In view of the problems described above, it is an advantage of the present invention to provide a motor control device for a flow control device which is capable of stopping a motor at a prescribed stop position so as to control the flow rate of a fluid with a high degree of precision.

In order to achieve the above advantage, according to the present invention, there is provided a motor control device for a flow control device including an opening part through which an upstream side of a fluid flow passage is in communication with a downstream side of the fluid flow passage, a valve element for controlling a flow of a fluid which passes through the opening part, a motor which includes a rotor and a stator and relatively moves the valve element with respect to the opening part, a drive control section by which the motor is rotationally driven and controlled, drive pulses which are outputted from the drive control section for rotationally driving the rotor of the motor, and a stop pulse which is outputted from the drive control section and set to be a period width longer than that of the drive pulse to stop the rotor of the motor at a prescribed position. When the stop pulse is applied to the motor, the rotor stops at the prescribed position by the magnetic detent torque between the rotor and the stator.

In this case, the drive control section preferably includes a step number setting section which outputs the prescribed number of drive pulses to rotationally drive the motor and a time period setting section which forms the stop pulse having the period width longer than that of the drive pulse.

In accordance with an embodiment of the present invention, the stop pulse having the period width longer than that of the drive pulse is further set to be the period width, by which the detent torque of the motor makes the rotor stop at a nearly prescribed rotational position, and is outputted just before stopping the rotor. This means the period width of the stop pulse is not always necessary to have enough time to make the rotor stop at the prescribed rotational position and the rotor can stop at the prescribed position by using the detent torque. As a result, as the valve element rotationally driven by the motor is capable of stopping at the prescribed position with a high degree of accuracy, the fluid can also be controlled by the valve drive device with a high degree of accuracy.

In accordance with an embodiment of the present invention, the stop pulse may be set to have a period width which is a little shorter than a damping period width that is required to make the rotor stop, or may be set to have a period width which is longer than the period width of the damping period width. Even though the stop pulse has the period width a little shorter than the damping period width, the rotor can stop at the prescribed position by the detent torque between the rotor and the stator. According to the motor control device having such a constitution, the damping (vibration) when the rotor stops is suppressed by applying the stop pulse, and thus, even a small detent torque is capable of making the rotor stop at the prescribed position in a stable manner.

In accordance with an embodiment of the present invention, as described above, the stop pulse places the rotor in a nearly stopped state and then the rotor can stop only by the detent torque. After the rotor stops by using the stop pulse, the stop position is held by the magnetic detent torque between the rotor and the stator and thus this saves power.

In accordance with an embodiment of the present invention, the stop pulse is formed by an applied voltage which has a voltage level lower than that of the drive pulse and outputted continuously to the drive pulse. According to the motor control device having such a constitution, even though the detent torque of the rotor is small, the rotor is stably positioned at the stop position by means of exciting the drive coils of the stator with the stop pulse having the lower applied voltage. Therefore, the valve element can be controlled to stop at the prescribed position with a high degree of accuracy and the activation at the start position can be surely performed when the next stepping drive is executed.

In accordance with an embodiment of the present invention, the motor is rotationally driven in the forward or backward direction to move the valve element of the valve drive device in the closing direction or the opening direction with respect to the opening part, and the stop pulse is outputted to the motor just before the rotor is to stop during either rotating direction. According to the motor control device having such a constitution, when the motor is rotationally driven in the forward/backward direction, the stop pulse is outputted to the motor just before stopping during either rotating direction. Therefore, the valve element of the valve drive device and thus the fluid can be controlled with a high degree of accuracy.

In accordance with an embodiment of the present invention, the valve element is formed in a tapered shape which is made thinner at the front end part than the stem base part so that the clearance to the opening part can be changed by the rotation of the motor. According to the motor control device having such a constitution, the output of the motor is transmitted to the valve element as the rotational motion. Therefore, the valve element can be controlled to stop at an accurate position by means of controlling the stop position of the motor with a high degree of accuracy, and energy loss is lowered.

Further, in order to achieve the above advantage, according to the present invention, there is provided a motor control device for a flow control device including a motor which is driven in a forward/backward direction by drive pulses outputted from a drive control section. The motor is repeatedly applied with forward and backward pulses at a prescribed position where a rotor is to stop, which rotationally drives the rotor in the forward and backward direction alternately to perform a wobbling motion at the prescribed position. According to the motor control device having such a constitution, the rotor stops substantially at the prescribed position by means of being driven in the forward or backward direction. Also in this case, the valve element rotationally driven by the motor can be controlled to be positioned with a high degree of accuracy.

In accordance with an embodiment of the present invention, the number of the forward/backward pulses is preferably set to be within the range of the backlash of a gear train of a decelerating mechanism provided between the motor and the valve element and thus the rotor performs the wobbling motion within the range of the backlash. According to the motor control device having such a constitution, even though the rotor is driven with the wobbling motion and moves in the forward/backward direction, the wobbling motion is performed within the range of the backlash of the gear train of the decelerating mechanism and therefore the valve element substantially stops at the prescribed position. Accordingly, the valve element can be controlled to be positioned with a high degree of accuracy.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 1 is a block diagram showing a motor control device for a flow control device in accordance with an embodiment of the present invention.

FIG. 2 is a time chart which shows an operation of the motor control device shown in FIG. 1.

FIG. 3(A) is a time chart which shows another operation of the motor control device shown in FIG. 1. FIG. 3(B) is a time chart which shows another operation of the motor control device shown in FIG. 1.

FIG. 4 is a cross sectional view showing a flow control device in accordance with an embodiment of the present invention.

FIG. 5(A) is a plan view showing the mechanical components in a completely closed state, which are arranged within a case of the flow control device shown in FIG. 4. FIG. 5 (B) is a plan view showing the mechanical components in a completely opened state of the flow control device shown in FIG. 4.

FIG. 6 is a plan view of an essential portion which shows a partly opened state of the flow control device.

FIG. 7 is a graph which shows a relationship between the position of a valve element from the closed state (0 STEP) to the completely opened state (1280 STEP) and its corresponding flow rate in the flow control device.

FIG. 8 is a time chart which shows an operation of a conventional motor control device for the flow control device.

DETAILED DESCRIPTION OF THE PREFERRED EMBODIMENTS

A motor control device for a flow control device in accordance with an embodiment of the present invention will be described below in detail with reference to the accompanying drawings. At first, the mechanism of the flow control device is described with reference to FIGS. 4, 5(A) and 5(B) to describe the constitution of the embodiment of the present invention.

The flow control device 1 shown in FIGS. 4, and 5(A) and (B) is used to control the flow of fluid such as liquefied petroleum (LP) gas, city gas, a coolant for a refrigerator or an air-conditioner, or the like.

The flow control device 1 includes a housing 2 which is formed in an airtight manner with a cup-shaped case 21 having a flange portion, a lid member 22 and a rubber packing 23 interposed between the lid member 22 and the case 21. A cylindrical part 24 within which a rotor 31 or the like of a stepping motor 30 is disposed is protruded upward on the lid member 22. A stator 33 of the stepping motor 30 is disposed on the outer peripheral face of the cylindrical part 24.

A fluid inlet port 26 is opened at a side face part of the housing 2 and a fluid outlet port 27 is opened at a bottom part of the housing 2. The inside of housing 2 is divided by a partition wall part 40 formed by a bottom portion of a plate 4 into an upstream side 11, on which the fluid inlet port 26 is located, and a cylindrical downstream side 12 on which the fluid outlet port 27 is located. An opening part 5 connecting the upstream side 11 to the downstream side 12 is formed in the partition wall part 40. In this opening part 5, the inlet port located on the upstream side 11 is formed so as to open in a horizontal direction (peripheral direction) and the outlet port located on the downstream side 12 is formed so as to open in a downward direction.

A valve element 6 formed in a tapered shape which is made thinner toward a front end part 62 from a flange-shaped stem base part 61 is disposed on an entrance side of the opening part 5. A rubber seal 63 (elastic member for seal) is fixed on the front face side of the stem base part 61 of the valve element 6 so as to surround the front end part 62 and thus air tightness in the completely closed state shown in FIG. 5(A) is ensured. In the completely closed state, the front end part 62 of the valve element 6 enters the inside of the opening part 5 and the inlet port of the opening part 5 is tightly closed by the stem base part 61 via the rubber seal 63.

On the other hand, in an opened state shown in FIG. 5(B), the valve element 6 is at a position retreated from the opening part 5. In the opened state, the stem base part 61 is separated from the circumference of the inlet port of the opening part 5 and the front end part 62 comes out from the inside of the opening part 5.

In an intermediate state between the completely closed state and the completely opened state as shown in FIG. 6, part of the front end part 62 of the valve element 6 enters the inside of the opening part 5. Therefore, the degree of opening the opening part 5 is adjusted by the clearance gap between the front end part 62 and the opening part 5.

In FIGS. 5(A) and 5(B), a direction shown by the arrow A is a closing direction and a direction shown by the arrow B is an opening direction. The valve element 6 is driven in a direction on a plane perpendicular to an output shaft 35 of the stepping motor 30 by means of a valve drive device 3 described below. The valve element 6 is constituted so as to trace a circular locus around the output shaft 35 of the stepping motor 30. Therefore, the front end part 62 of the valve element 6 is formed in a curved shape corresponding to the circular locus of the valve element 6, and the planar shape of the opening part 5 is formed in a curved shape corresponding to the circular locus of the valve element 6 and the curved shape of the front end part 62 of the valve element 6.

The valve drive device 3 is provided with a stepping motor 30 capable of rotating in forward/backward directions and a transmission mechanism 70 including a train of gears in order to drive the valve element 6 in the direction shown by the arrow A or the arrow B. The transmission mechanism 70 is disposed within the cup-shaped case 21.

In the valve drive device 3 as shown in FIG. 4, the output shaft 35 of the stepping motor 30 is rotatably supported by a receiving portion of the plate 4. At a side position of the output shaft 35 is disposed the transmission mechanism 70 including a first gear wheel 71 having outer teeth which are engaged with a pinion fixed on the output shaft 35 and a second gear wheel 72 disposed at a side position of the first gear wheel 71 and having outer teeth which are engaged with a pinion fixed on a rotary shaft of the first gear wheel 71.

A guide groove 44 is formed in a peripheral direction on the partition wall part 40 of the bottom part of the plate 4 along the inner peripheral wall of the plate 4 as shown in FIG. 5. An arc-shaped movable body 8 is disposed on the guide groove 44. The movable body 8 is provided with inner teeth which are formed on an arc-shaped inner peripheral face and engage with the pinion fixed on the rotary shaft of the second gear wheel 72. The above-mentioned valve element 6 is formed at the end portion of the movable body 8 in an integral manner.

In the flow control device 1 having such a constitution, when the output shaft 35 of the stepping motor 30 rotates in the counterclockwise direction CCW from the completely closed state shown in FIG. 5(A), the first gear wheel 71 rotates in the clockwise (CW) direction and the second gear wheel 72 rotates in the counterclockwise (CCW) direction. As a result, the movable body 8 rotates in the counterclockwise (CCW) direction by the pinion fixed on the rotary shaft of the second gear wheel 72, which engages with the inner teeth of the movable body 8, and the valve element 6 is driven in the opening direction as shown by the arrow B (see FIG. 5(B)). Meanwhile, the opening degree of the opening part 5 increases gradually from the completely closed state depending on the moving distance of the valve element 6 to increase the flow rate gradually.

Therefore, the flow rate which flows out from fluid outlet port 27 via the fluid inlet port 26 and the opening part 5, varies linearly according to the number of steps of the stepping motor 30 or the angular position of the valve element 6 from the completely closed state as shown in FIG. 7.

On the other hand, when the output shaft 35 of the stepping motor 30 rotates in the clockwise (CW) direction from the opened state shown in FIG. 5(B), the first gear wheel 71 rotates in the counterclockwise (CCW) direction and the second gear wheel 72 rotates in the clockwise (CW) direction. As a result, the movable body 8 rotates in the clockwise (CW) direction and the valve element 6 is driven in the closing direction as shown by the arrow A to be in the completely closed state (see FIG. 5(A)).

The valve drive device 3 is constituted in such a manner that the valve drive device 3 is further driven in a more compressed direction of the rubber seal 63 than the closed state to a state where the valve element 6 is tightly contacted with the circumference of the inlet port of the opening part 5 via the rubber seal 63. The more compressed state than the closed state is determined as a home position of the completely closed state.

The drive pulses of a specific number of steps are applied to the stepping motor 30 from a control device not shown in the drawing to change the angular position of the valve element 6. For example, when warm water of a specific temperature is required, while the water temperature is monitored by a temperature sensor, the angular position of the valve element 6 gradually changes by driving the stepping motor 30 using a step by step driving method to adjust the flow rate of gas, which becomes a heat source.

Next, a motor control device for the above-mentioned flow control device in accordance with an embodiment of the present invention will be described below.

FIG. 1 is a block diagram showing a motor control device for a flow control device in accordance with an embodiment of the present invention. In FIG. 1, the notational symbol 30 denotes a stepping motor and the notational symbol 31 denotes a rotor having a permanent magnet magnetized into two poles. The rotor rotates by exciting drive coils 33a of a stator 33. The notational symbol 33b denotes a magnetic pole of the stator 33 (only two poles of the entire magnetic poles are shown). The notational symbol 102 denotes a drive section for outputting drive voltages of φA, φ/A, φB, φ/B to the drive coils 33a of the stator 33 according to drive pulses of a drive pulse generating section 101. The drive section 102 also turns on or off the energization of the drive voltages to the drive coils 33a according to step signals from a step number setting section 100. The notational symbol 103 denotes a time setting section for forming a stop pulse having a longer time period width than that of the drive pulse to be outputted to the drive coil 33a, just before stopping the rotor 31. The time setting section 103 sets the period width of the stop pulse and is assembled into a program of a microcomputer for performing various kinds of control such as temperature control of the flow control device 1.

In the motor control device constituted above, the step number setting section 100 sets a prescribed number of n-steps of the drive pulses to be outputted to the drive coil 33a according to a signal required to rotate the valve element 6 at a specified angle based on a control signal of the microcomputer. In other words, as shown in FIG. 2, in the step number setting section 100, the drive pulses DP with a period width t1, which are required to rotate the rotor 31, are outputted to the drive pulse generating section 101 during the first drive pulse to the (n−1) steps of the drive pulses. Further, the step number setting section 100 is constituted so as to output the signal of the stop pulse SP with a period width t2 as a final n step pulse to the drive pulse generating section 101. The period width t2 of the stop pulse SP, which is the final n step, is longer than the period width t1 of the drive pulse DP.

The drive pulse generating section 101 receives the instruction of the step number setting section 100 and successively outputs the signals of (n−1) drive pulses DP having the period width t1 to the drive section 102. The drive means 102 outputs the drive voltages of φA, φ/A, φB, φ/B to the drive coils 33a to excite the stator 33 and rotate the rotor 31.

As an example, assume that when the output shaft 35 of the rotor 31 rotates in a clockwise (CW) direction by using 3 steps as the number of steps, the drive coils 33a are first excited by a first drive pulse DP as shown in FIG. 2 to urge the rotation of the rotor 31 in the CW direction. At this time, the rotor 31 experiences vibrations or a damping motion caused by the braking force due to the detent torque, which is generated between the magnetic poles 33b of the stator 33 and the rotor 31, and the inertia force of the rotor 31.

Then, when the drive coils 33a are excited by a second drive pulse DP, the rotor 31 is further urged and rotates in the clockwise direction and the damping motion occurs again. Then, the drive coils 33a are excited by a third pulse, stop pulse SP. The period width t2 of the stop pulse SP is set to be longer than the period width t1 of the drive pulse DP in such a manner that the amplitude of the damping motion of the rotor 31 decreases so that the rotor 31 can be held by the detent torque between the rotor 31 and the stator 33. Therefore, the magnetic pole of the rotor 31 is magnetically attracted to the magnetic poles 33b by means of the longer excitation of the drive coils 33a of the stator 33 by applying the stop pulse SP. Moreover, the damping motion is suppressed and decreased by the detent torque so as to stop the rotor 31 at a specified position. The stop pulse SP is turned off after the application of the pulse having the period width t2 and then no energization state is obtained.

The period width t2 of the stop pulse SP may be set a little shorter or longer than the time period of the damping motion required to stop the rotor 31. The stop pulse SP is applied to the drive coils 33a to excite them and the magnetic poles of the rotor 31 are magnetically attracted to the magnetic poles 33b and subjected to the braking effect and thus the damping motion of the rotor 31 decreases. When the damping motion becomes small, the rotor 31 can stop at the specified position by the detent torque even if the excitation by the stop pulse SP is turned off. As described above, the period width t2 capable of stopping the rotor 31 at the specified position by the detent torque may be set in a little shorter than that of the damping time period required to stop the rotor 31. The period width t2 of the stop pulse SP may be set to be the same as the damping period width which is required to stop the rotor 31. Also, the period width t2 may be set to be a little longer than the damping period width and, in this case, the time period required to stop the rotor 31 can be shortened.

As described above, when the rotor 31 of the motor 30 stops at the specified position, the valve element 6 driven and moved by the rotation of the motor 30 accurately stops at the specified position with respect to the opening part 5. As a result, the clearance G between the valve element 6 and the opening part 5 shown in FIG. 6 becomes a specified clearance, and thus the flow rate of gas becomes a prescribed value and the controlling temperature with a high degree of accuracy can be achieved.

In the above-mentioned control, the output shaft 35 of the stepping motor 30 rotates in the clockwise (CW) direction and the valve element 6 is driven in the closing direction as shown by the arrow A to control the flow rate of the fluid in a limited state and, for example, to lower the water temperature. When the water temperature is increased, the output shaft 35 of the stepping motor 30 rotates in the counterclockwise (CCW) direction by means of the instruction of the microcomputer to rotate the rotor 31 in the opposite direction. The output shaft 35 of the stepping motor 30 rotates in the counterclockwise (CCW) direction to drive the valve element 6 in the opening direction as shown by the arrow B and the water temperature rises by means of increasing the flow rate of the fluid.

FIGS. 3(A) and 3(B) show another embodiments of the motor control device to which the present invention is applied. FIG. 3(A) shows an embodiment in which the stop pulse SP, whose applied voltage is lower than that of the drive pulse DP, is outputted continuously after the last drive pulse DP to stop the rotor 31. Since the voltage of the stop pulse SP is lower than the drive pulse DP, the stop pulse SP applied to the drive coils 33a does not make the rotor 31 move to the next step position but only excites the drive coils 33a at the position corresponding to the last drive pulse DP. Therefore, the magnetic poles of the rotor 31 are magnetically attracted to the magnetic poles 33b and subjected to the braking effect and thus the damping motion of the rotor 31 is reduced. When the damping motion becomes small, the rotor 31 stops at the specified position by the detent torque even if the excitation by the stop pulse SP is turned off before the rotor 31 does not stop completely. In this example, the stop pulse SP is continuously outputted so as to succeed the last drive pulse DP to stop the rotor 31. Therefore, the stop pulse SP serves to suppress the damping motion of the rotor 31 and the rotor 31 stops at the position where the last drive pulse DP is applied.

As described above, in the flow control device in accordance with the embodiment of the present invention, the detent torque is decreased because the cylindrical part 24 is disposed between the rotor 31 and the stator 33, which results in the increase of the clearance between the rotor 31 and the stator 33. Accordingly, the rotor 31 is liable to move and displace from the specified stop position due to the vibration or the like from the external. However, in the embodiment described above, the stop pulse SP whose applied voltage is set lower than that of the drive pulse DP is applied continuously, and the magnetic poles of the rotor 31 are magnetically attracted to the magnetic poles 33b to retain the specified stop position. In the case that the retaining of the rotor 31 by energization is not required after the rotor has stopped, the period width of the stop pulse SP may be set to be the period width by which the damping amplitude of the rotor 31 becomes to the extent that the rotor can be retained by the detent torque between the rotor 31 and the stator 33. When the stop pulse SP having the period width determined as described above is applied to the drive coils 33a, the rotor can be retained only by the detent torque under no energization state.

FIG. 3(B) shows further another embodiment of the motor control device to which the present invention is applied. In this embodiment, the pulses for rotating the stepping motor 30 in alternately forward/backward directions are used as the stop pulse SP. According to this embodiment, the rotor 31 is driven and moved in the forward/backward directions at the position where the rotor is to be stopped by the detent torque as the center. That is, the rotor 31 is driven with a wobbling motion at the prescribed stop position as the center. In the constitution of the stepping motor described above, the cylindrical part 24 is disposed between the rotor 31 and the stator 33 to cause an increase in the clearance between the rotor 31 and the stator 33. Therefore, the detent torque between the rotor 31 and the stator 33 becomes smaller in the case of the embodiment shown in FIG. 4 than the motor without the cylindrical part 24. Thus it is a possibility that the rotor 31 may not stop at the specified position accurately. Accordingly, in this embodiment, forward/backward pulses are alternately applied to the drive coils 33a of the stator 33 as the stop pulse SP. Therefore, the rotor 31 is driven and rotates in the forward/backward directions to be subjected to the wobbling motion at the specified position where the rotor is to stop as the center, and the rotor 31 can be substantially held at the specified position.

In other words, as shown in FIG. 3(B), the notational symbol "C" denotes the specified stop position where the rotor 31 is to stop. The stop pulse SP, which uses the drive pulses DP in this example, is applied as follows. At first, drive pulses DP in the forward rotating direction are applied to rotate the rotor 31 in a positive direction from the detent torque position (−1) to the detent torque position (+1) through the "C" position. Then, drive pulses are applied in the backward direction to rotate the rotor 31 in the opposite direction from the detent torque position (+1) to the detent torque position (−1) through the "C" position. And then, pulses in the forward rotating direction are applied again to rotate the rotor 31 in the positive direction, and such the forward rotation and the backward rotation are repeated successively. As a result, the rotor 31 is driven in such the wobbling motion at the prescribed position "C" as the center so as to reciprocate between the one preceding detent torque position (−1) and the one next detent torque position (+1), and thus the rotor 31 is retained at the substantially prescribed position. In this case, although the rotor 31 does not stop at the prescribed position, the rotor is retained at the substantially prescribed position by applying the drive pulses as the stop pulse SP.

In the above-mentioned embodiment, even when the wobbling drive is executed, the valve element 6 is retained in the state substantially stopped in the prescribed position. This is because the rotor 31 has a mass and the gear train of the decelerating mechanism as described above is provided between the motor 30 and the valve element 6 in order to drive the valve element 6. Generally the gear train of the decelerating mechanism has a backlash. Therefore, as such the wobbling drive is absorbed by the gear train and the valve element 6 is held so as to be stopped at the substantially prescribed position. Accordingly, the wobbling motion can be absorbed by the gear train when the step number or the magnitude of the wobbling drive are set to be the range within the backlash of the gear train. Therefore, the wobbling motion is not transmitted to the valve element 6 and the prescribed position can be retained. In this embodiment, the wobbling drive is continued until an instruction to move to the next position setting is inputted. However, it may be constituted in such a manner that the wobbling drive may be stopped after an appropriate period.

In the embodiment described above, a stepping motor is used for the motor. However, another d-c motor having a detent torque between a rotor and a stator can be used.

In addition, the above-mentioned embodiment is constituted so as to adjust the opening degree of only one opening part 5. However, a plurality of opening parts may be provided and combinations of the opening/closing states of the plurality of opening parts are changed by the valve element 6, which is controlled by the motor in order to control a plurality of the flow rates.

The valve element 6 may be driven to make a rotational motion as the above-mentioned embodiment but may be driven to make a linear motion. Further, the valve element 6 may be formed in a screw shape and the screw-shaped valve element 6 is constituted so as to move into or out of a screw-formed groove portion as the valve element 6 rotates. In this case, it is preferable to provide a mechanism for converting the rotational motion of the motor to a linear motion.

In addition, the fluid which is the object to be controlled of the flow rate may be not only gas but also liquid.

As described above, the motor control device for a flow control device according to the present invention is constituted so as to output the stop pulse which is set to be the period width longer than that of the drive pulse and the period width required to suppress the damping motion within the range where the detent torque can stop the rotor. Therefore, when the stop pulse is applied to the motor, the rotor stops at the prescribed position by the magnetic detent torque between the rotor and the stator. As a result, as the valve element rotationally driven by the motor stops at the prescribed position with a high degree of accuracy, the fluid can be accurately controlled by the valve drive device. Furthermore, the activation at starting can be surely performed when the next stepping drive is executed.

Also, the motor control device for a flow control device according to another present invention includes a stop pulse made of repeatedly applied forward and backward pulses, which rotationally drives the rotor in the forward and backward direction alternately to perform a wobbling motion at the prescribed position. Therefore, the rotor stops substantially at the prescribed position by means of being excited in the forward or backward direction. Also in this case, the valve element driven by the motor can be controlled to be positioned with a high degree of accuracy.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor control device for a flow control device comprising:
   an opening part through which an upstream side of a fluid flow passage is in communication with a downstream side of the fluid flow passage;
   a valve element that controls a flow of a fluid which passes through the opening part;
   a motor which includes a rotor and a stator that relatively moves the valve element with respect to the opening part;
   a drive control section by which the motor is rotationally driven and controlled;
   drive pulses which are outputted from the drive control section for rotationally driving the rotor of the motor; and
   a stop pulse which is outputted from the drive control section and set to be a period width longer than that of the drive pulse for stopping the rotor of the motor at a prescribed position,
   wherein the stop pulse is applied to the motor and the rotor stops at the prescribed position by a magnetic detent torque between the rotor and the stator.

2. The motor control device for a flow control device according to claim 1, further comprising:
   a step number setting section which is provided in the drive control section and outputs prescribed drive pulses to rotationally drive the motor, and
   a time setting section which is provided in the drive control section and forms the stop pulse having the period width longer than that of the drive pulse.

3. The motor control device for a flow control device according to claim 1, wherein the stop pulse is applied to a drive coil of the stator just before making the rotor stop at the prescribed position.

4. The motor control device for a flow control device according to claim 1, wherein the stop pulse is set to have either a period width which is a little shorter than a damping period width that is required to make the rotor stop or a period width which is equal to or longer than the period width of the damping period width.

5. The motor control device for a flow control device according to claim 1, wherein an applied period width of the stop pulse is a period width that causes the rotor to stop at the prescribed position by the magnetic detent torque between the rotor and the stator.

6. The motor control device for a flow control device according to claim 1, wherein the stop pulse is continuously outputted with the drive pulse.

7. The motor control device for a flow control device according to claim 6, wherein the stop pulse is an applied voltage which is lower than that of the drive pulse.

8. The motor control device for a flow control device according to claim 1, wherein the valve element moves so as to adjust an aperture area of the opening part to adjust a flow rate of the fluid passing through the opening part.

9. The motor control device for a flow control device according to claim 8, wherein a rotation of the motor is transmitted to the valve element of the valve drive device and the motor is rotationally driven in a forward and a backward direction so that the valve element opens or closes the opening part.

10. The motor control device for a flow control device according to claim 8, wherein the valve element is formed in a tapered shape which is made thinner at a front end part than a stem base part so that a clearance to the opening part is changed by rotation of the motor.

11. The motor control device for a flow control device according to claim 10, wherein the front end part of the valve element is inserted into the opening part and the stem base part of the valve element closes the opening part.

12. The motor control device for a flow control device according to claim 1, further comprising a cylindrical part, inside of which the rotor is disposed and outside of which the stator is disposed, and wherein the stator is fitted on an outer peripheral surface of the cylindrical part.

13. The motor control device for a flow control device according to claim 12, wherein the stop pulse prevents shifting the prescribed stop position of the rotor caused by a decrease of the magnetic detent torque due to the cylindrical part between the rotor and the stator.

14. A motor control device for a flow control device comprising:
   an opening part through which an upstream side of a fluid flow passage is in communication with a downstream side of the fluid flow passage;
   means for controlling a flow of a fluid which passes through the opening part;
   a motor which includes a rotor and a stator that relatively moves the means for controlling with respect to the opening part;
   a drive control section by which the motor is rotationally driven and controlled;
   drive pulses which are outputted from the drive control section for rotationally driving the rotor of the motor; and
   a stop pulse which is outputted from the drive control section and set to be a period width longer than that of the drive pulse for stopping the rotor of the motor at a prescribed position,
   wherein the stop pulse is applied to the motor and the rotor stops at the prescribed position by a magnetic detent torque between the rotor and the stator.

15. The motor control device for a flow control device according to claim 16, further comprising:
   a step number setting section which is provided in the drive control section and outputs prescribed drive pulses to rotationally drive the motor, and
   a time setting section which is provided in the drive control section and forms the stop pulse having the period width longer than that of the drive pulse.

16. The motor control device for a flow control device according to claim 14, wherein the stop pulse is applied to a drive coil of the stator just before making the rotor stop at the prescribed position.

17. The motor control device for a flow control device according to claim 14, wherein the stop pulse is set to have either a period width which is a little shorter than a damping period width that is required to make the rotor stop or a period width which is equal to or longer than the period width of the damping period width.

18. The motor control device for a flow control device according to claim 14, wherein an applied period width of the stop pulse is a period width that causes the rotor to stop at the prescribed position by the magnetic detent torque between the rotor and the stator.

* * * * *